(No Model.) 2 Sheets—Sheet 1.
B. C. BRADLEY.
SKIM PLOW OR COLTER.
No. 270,628. Patented Jan. 16, 1883.
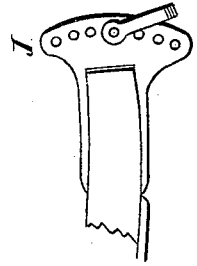
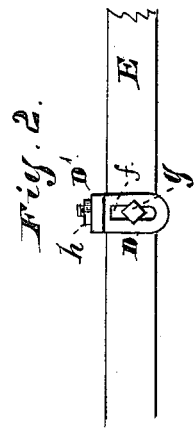
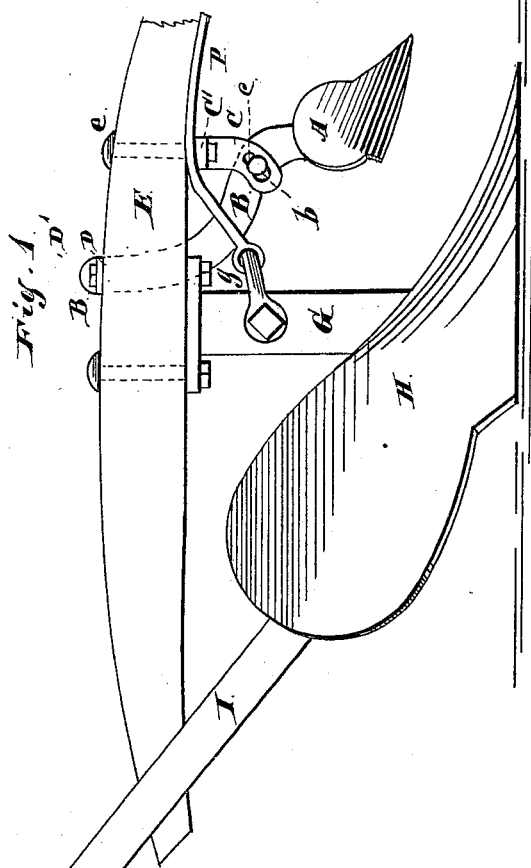
Witnesses
Albert H. Adams.
Edgar T. Bond
Inventor:
Byron C. Bradley (No Model.) 2 Sheets—Sheet 2.
B. C. BRADLEY.
SKIM PLOW OR COLTER.
No. 270,628. Patented Jan. 16, 1883.
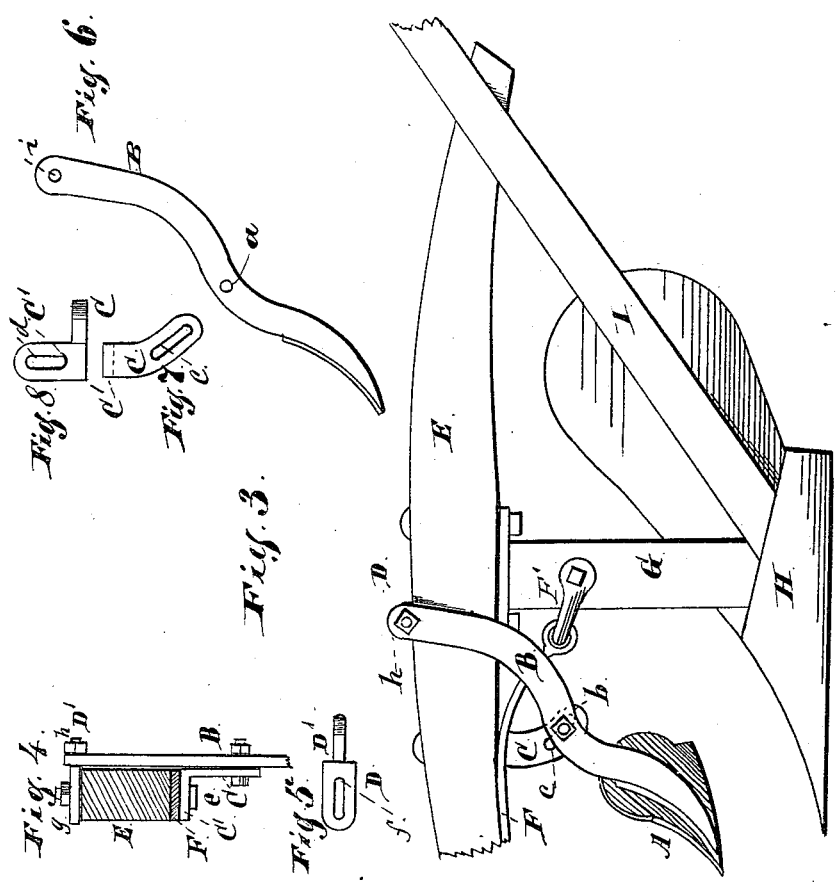
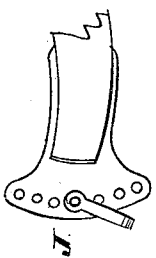
Witnesses:
Albert H. Adams.
Edgar T. Bend
Inventor:
Byron C. Bradley ary 16, 1883.

UNITED STATES PATENT OFFICE.

BYRON C. BRADLEY, OF CHICAGO, ILLINOIS, ASSIGNOR TO THE FURST & BRADLEY MANUFACTURING COMPANY, OF SAME PLACE.

SKIM PLOW OR COLTER.

SPECIFICATION forming part of Letters Patent No. 270,628, dated January 16, 1883.

Application filed June 19, 1882. (No model.)

*To all whom it may concern:*

Be it known that I, BYRON C. BRADLEY, residing at Chicago, in the county of Cook and State of Illinois, and a citizen of the United States, have invented a new and useful Improvement in Skim Plows or Colters, of which the following is a full description, reference being had to the accompanying drawings, in which—

Figure 1 is a side elevation with the beam broken, showing the furrow side of the plow; Fig. 2, a detail, being a top or plan view, showing the upper attaching-bracket for the skim plow or colter; Fig. 3, a side elevation with the beam and handle broken, showing the land side of the plow; Fig. 4, a cross-section through the beam, showing the skim plow or colter shank broken and its attaching-brackets; Fig. 5, a detail showing the upper attaching-bracket; Fig. 6, a detail showing the standard of the skim plow or colter; Figs. 7 and 8, details showing the lower or under attaching-bracket for the skim plow or colter.

The object of this invention is to attach a skim plow or colter to the plow-beam, so that it can be adjusted both vertically and transversely to regulate the cutting; and its nature consists in the novel construction and arrangement of the attaching-brackets and standard or shank of the skim plow or colter in their relation to each other and to the plow-beam, as hereinafter more specifically pointed out and described.

In the drawings, A represents a skim plow or colter of any of the usual and well-known forms of construction.

B is a standard or shank, made of wrought metal or other suitable material, to the lower end of which the skim plow or colter is fastened in any suitable manner. This standard or shank is bent in the form shown, or other approximate form which will give the plow or colter the requisite hang when the parts are in position. This standard or shank, at its upper end, is provided with a circular opening, *i*, and is also provided with a hole or opening, *a*, located to pass the attaching-bolt through the slot of the attaching-bracket in securing the plow or colter in different positions.

C C' represent the lower or under attaching-bracket, made of a single piece of wrought-iron or other suitable material, bent or otherwise formed to have the two parts stand at right angles, or nearly so, to each other. The portion C, as shown, has a curved form, the curve being that which the standard or shank describes in swinging. This portion C is provided with a slot, *c*, also having a curved form corresponding to the swing of the standard or shank, through which slot a bolt, *b*, passes, by means of which the standard or shank B is attached to part C, the bolt passing through the opening or hole *a* in the standard. The bolt *b*, after being passed through the standard and bracket and the standard adjusted properly, is held in position in the slot by applying the nut and setting it down, clamping the standard B firmly in whatever position it may be adjusted. By loosening the nut the position of the standard can be changed. The other portion, C', of this bracket is provided with a slot, *d*, through which the stem of a bolt, *e*, passes, which bolt passes through the plow-beam and attaches the bracket to the under face of the beam, the attachment being at the proper point to bring the portion C in proper position for the slot *c* to coact with the hole *a* and allow the skim-colter to be raised and lowered.

D is a bracket, made of wrought-iron or other suitable material, and having a circular shank or stem, D', the end of which is screw-threaded to receive a nut, *h*. This bracket or plate D is provided with a longitudinal slot, *f*, through which the stem of a bolt, *g*, passes, which bolt passes through the plow-beam and attaches the bracket or plate to the top of the beam. This same bolt, *g*, is also one of the bolts by which the standard of the main plow is attached to the beam. The shank or stem D' receives the upper end of the standard or shank B, passing through the opening *i*, and forms a pivot on which the standard can turn or swing and be raised or lowered, and the standard or shank, when in position, is locked or held by the nut *h* on the end of stem D'. The longitudinal slot *d* in part C' and the longitudinal slot *f* in part D allow the parts C C' D to be adjusted in or out, by which adjustment the plow or colter can be set to cut at the desired distance.

E is the plow-beam; F, the beam-strap, of wrought-iron or other suitable material, attached to the under side of a wooden beam for the purpose of strengthening the beam, its rear end being attached to a clevis pivoted to the main plow-standard, as shown; G, the main plow-standard; H, the plow; I, the handles; J, the draft-clevis. The parts represented by the letters E F G H I J are to be of any of the usual and well-known forms of construction and arrangement for these parts.

The attachment of the skim plow or colter is made as follows: The bracket C C' is attached to the under side of the beam, or, as shown, to the under side of the beam-strap, by passing a bolt, e, through the slot d and strap and beam, and the bracket or plate D is attached to the upper edge of the beam by passing the bolt g through the slot f and beam, and the clamp-nuts are screwed down on the ends of the bolts e g. The upper end of the standard B is slipped onto the end or shank D' and the clamping-nut h screwed down. The bolt b is passed through the slot c and the opening a and the clamping-nut screwed down, securing the plow or colter in position.

When attached, the plow or colter can be adjusted to cut a wide or narrow strip very readily and easily, and all that is necessary to be done to adjust for the width of strip is to loosen the clamping-nuts of the bolts e g and move the brackets or plates in or out, as required; and to adjust the depth of cut all that has to be done is to loosen the clamping-nut of the bolt b and turn the standard or shank on its pivotal point, as required, to raise or lower the plow or colter, and after the desired adjustment is made again tighten the clamping-nuts. This arrangement furnishes a ready means for attachment of the skim plow or colter, and one by which such attachment is made adjustable both laterally and vertically, and by locating the brackets as described it will be seen that one bracket is attached by the same bolt attaching the main standard, and where a beam-strap is used the other bracket can be attached by the rear bolt for such strap, so that an increase in the number of bolts is not required, and the weakening of the beam by extra holes for attachment of the bracket is avoided.

The devices are very simple in their construction, can be easily applied to any of the ordinary forms of plows, and although primarily designed for use with a wooden beam they can be used with other forms of beams.

What I claim as new, and desire to secure by Letters Patent, is—

The combination, with the plow-beam, of the upper bracket, D, having an attached shank, D', the under bracket formed with the right-angled parts C and C', the latter having the slot c, and the standard B, carrying a skim plow or colter, A, and hung at its upper end to swing on the shank of the upper bracket for raising and lowering the skim plow or colter, said standard being connected with the slotted portion of the under bracket by a bolt, b, adjustable in the slot thereof, substantially as described.

BYRON C. BRADLEY.

Witnesses:
ALBERT H. ADAMS,
EDGAR T. BOND.